Sept. 3, 1940.  A. C. BEDWELL  2,213,268
TOBACCO HARVESTING IMPLEMENT
Filed Oct. 10, 1939
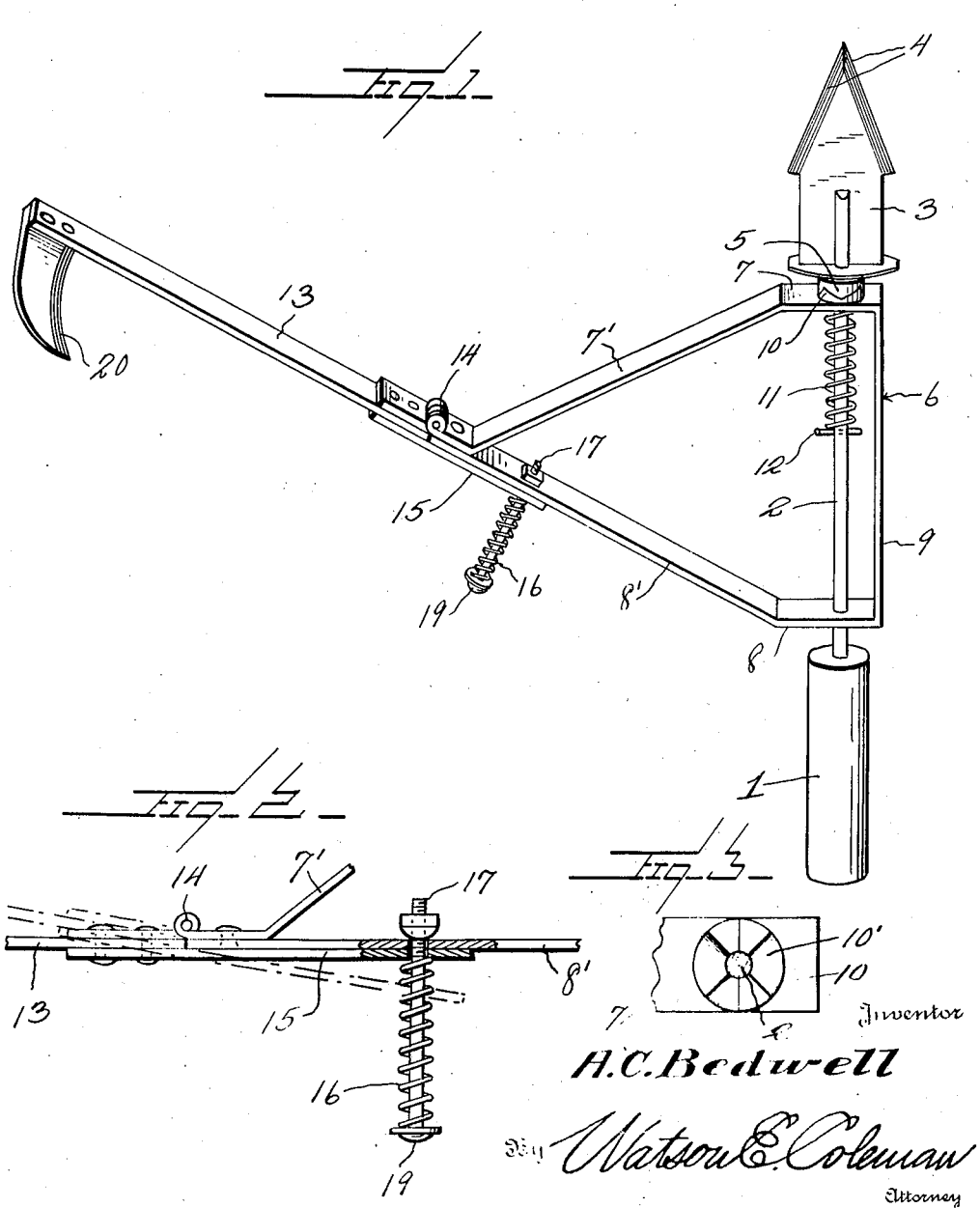

Patented Sept. 3, 1940

2,213,268

UNITED STATES PATENT OFFICE 2,213,268

TOBACCO HARVESTING IMPLEMENT

Allen C. Bedwell, Blountville, Tenn., assignor of one-half to Chas. H. Masengill, Blountville, Tenn.

Application October 10, 1939, Serial No. 298,862

8 claims. (Cl. 56—27.5)

This invention relates generally to the class of cutlery and pertains particularly to an improved tobacco spear and cutting knife.

In the harvesting of tobacco, the stalks of the plants are cut off adjacent the ground and the stalk is then split at or near the butt to form a slot or opening to receive the end of a stick upon which a number of the stalks are suspended while the leaves of the plant are drying, or instead of splitting the stalk, the stick itself is sharpened at one end or is provided with a spearhead and the butt end of the stalk is forced over the sharpened end of the stick or over the spearhead so that the stalk will be threaded onto the stick. This procedure involves a number of independent and time consuming operations.

An object of the present invention is to provide a tool or implement by means of which the cutting and splitting or piercing of the plant stalk may be accomplished with fewer operations and in less time than is required in the present procedure, by the provision of a combination stalk spearing and cutting knife which is so constructed that the spearing and cutting of the stalk may be performed substantially as a single operation.

Another and more specific object of the invention is to provide a tobacco harvesting tool comprising in one unit a stalk splitting spear and a cutting knife joined to a handle in such a manner that the stalk of the plant may be slit and cut simultaneously and the plant conveyed on the slitting spear of the implement to the pointed stick to which it may be transferred directly from the spear.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in perspective of the implement embodying the present invention.

Fig. 2 is a fragmentary detail view illustrating the hinge connection between the cutter knife and the frame.

Fig. 3 is a view in plan of the notched portion of the coupling element between the frame and the spear blade.

Referring now more particularly to the drawing, the numeral 1 designates the handle for the present harvesting implement. This handle has secured thereto and extending longitudinally therefrom the shaft or spear blade shank 2 which at its outer end is secured to the side face of and to extend longitudinally along a stalk piercing blade or spear 3 having the converging cutting edges 4 which come together to form a spear point which is directed longitudinally of the shank 2.

At the inner end of the spear blade 3 there is formed on the shank 2 a V-lug 5.

The numeral 6 designates a frame having the spaced parallel side portions 7 and 8 connected together by the longitudinally extending portion 9. These side portions 7 and 8 are apertured to receive the shank 2 on which the frame is adapted to turn. The side portion 7 of the frame has formed integrally therewith a notched block 10 in the outer face of which are formed the right angularly related V-notches 10', and in one of these V-notches the lug 5 is adapted to position so as to hold the shank 2 and the frame against relative turning. The frame is normally urged forwardly on the blade shank 2 by the spring 11 which encircles the shank within the frame, bearing at one end against the side 7 and having its other end coupled with the shank by means of a cotter key 12 or in any other suitable manner.

The sides 7 and 8 are extended laterally to form the converging portion 7', 8' and at the outer end of the portion 8' there is connected to the frame an arm 13 by means of a hinge 14 which permits the arm to swing longitudinally of the shank 2. The arm 13 is normally maintained alined with the frame portion 8' by providing the inner end extension or terminal 15 which overlies the frame portion 8' and is urged toward the same by the spring 16 which encircles the bolt 17 which has one end joined to the frame arm portion 8'. The extension 15 is suitably apertured to permit its movement lengthwise of the bolt 17 and the spring 16 encircles the bolt and is interposed between the extension 15 of the arm and the head 19 at the outer end of the bolt. The inner end of the bolt has a nut 18 threaded thereon which bears against the inner side of the arm 8', as shown. Upon the outer end of the arm 13 is secured a cutting knife 20 which is arranged so that the cutting edge thereof extends perpendicularly to the shank 2.

In the use of the present harvesting implement, the harvester first disposes the cutting knife 20 upon the far side of the tobacco plant stalk with the edge of the knife extending across the stalk. The spear 3, being previously arranged in the plane of the frame, is then thrust through the stalk at the desired height and by then giving the spear blade a quarter turn by the handle and at the same time giving an upward pull or an upward and forward swinging movement to the implement, the cutting blade is pulled toward the harvester so that the splitting of the stalk and the cutting off of the stalk are accomplished substantially at one movement. When the spear blade is given a quarter turn, the stalk will be spread open where the spear blade has entered to a distance of about 2 inches, thus making the aperture in the stalk wide enough to receive the pointed end of the stick to which the stalk is to be transferred. The operator then picks up the stalk and turns it over so that the head of the stalk will hang down from the implement, the spear blade being in the meantime disposed transversely of the stalk in the slit which the blade has made. With the plant thus inverted the operator, holding by one hand onto the handle 1 and by the other hand onto the stalk of the tobacco plant, is able to slip the pointed end of the hanger stick into the split and by then giving a quarter turn to the spear blade, he can bring it back to the position which it occupied with respect to the stalk when it was first thrust through the stalk and can then remove the blade from the split stalk. It will be apparent that by providing the double lock the spear blade may be securely held in a common plane with the frame or in a plane perpendicular to the plane of the frame as may be desired.

From the foregoing, it will be readily obvious that with the implement embodying the present invention, the operation of cutting and splitting and placing tobacco stalks upon the supporting sticks is greatly simplified so that it is possible for one man to do the work of two and in addition to this, the harvesting of the tobacco plants is accomplished with less loss of leaves than is the case with the present methods of harvesting.

What is claimed is:

1. A tobacco plant harvester, comprising a handle body, a spear blade carried by the handle body, a cutting blade, and means operatively coupling the cutting blade with the handle which is so constructed and arranged that the cutting blade may be drawn across a standing tobacco stalk to sever the same while the spear blade is directed through the stalk.

2. A tobacco harvester of the character described, comprising a handle body, a shank carried by and extending from the handle, a pointed stalk splitting blade carried by said shank, and a stalk cutting blade carried by the shank, said stalk splitting blade being joined to the handle with the line of direction of its point extending at right angles to the line of the cutting edge of the stalk cutting blade.

3. A tobacco harvester of the character described, comprising a handle body, a shank carried by and extending from the handle, a pointed stalk splitting blade carried by said shank, and a stalk cutting blade carried by the shank, said stalk splitting blade being jointed to the handle with the line of direction of the point extending at right angles to the line of the cutting edge of the stalk cutting blade, said stalk cutting blade being connected with said shank in a manner to facilitate movement of the cutting blade around and concentric with the long axis of the shank.

4. A tobacco stalk splitter and cutter, comprising a handle body, a shank connected with and extending from said handle body, a splitting blade in the form of a spear attached to said shank and directed away from the handle body, a frame supported from the shank between the handle and splitting blade and having a laterally extending portion, and a stalk cutting knife carried by a laterally extending portion of said frame remote from the shank and having the line of its cutting edge directed transversely of the shank.

5. A tobacco stalk splitter and cutter, comprising a handle body, a shank connected with and extending from said handle body, a splitting blade in the form of a spear attached to said shank and directed away from the handle body, a frame supported from the shank between the handle and splitting blade and having a laterally extending portion, a stalk cutting knife carried by a laterally extending portion of said frame remote from the shank and having its cutting edge directed transversely of the shank, said shank being supported by the frame to be turned on its long axis, and spring pressed latching means normally holding the shank against turning movement.

6. A tobacco stalk splitter and cutter, comprising a handle body, a shank connected with and extending from said handle body, a splitting blade in the form of a spear attached to said shank and directed away from the handle body, a frame supported from the shank between the handle and splitting blade and having a laterally extending portion, a stalk cutting knife carried by a laterally extending portion of said frame remote from the shank and having its cutting edge directed transversely of the shank, said shank being supported by the frame to be turned on its long axis, the frame being movable longitudinally of and on the shank, releasable coupling means between the frame and the shank which is released by the longitudinal movement of the frame in one direction on the shank, and spring means normally urging the longitudinal movement of the frame on the shank in a direction to maintain said coupling means engaged.

7. A tobacco stalk splitter and cutter, comprising a handle body, a shank connected with and extending from said handle body, a splitting blade in the form of a spear attached to said shank and directed away from the handle body, a frame supported from the shank between the handle and splitting blade and having a laterally extending portion, a stalk cutting knife carried by a laterally extending portion of said frame remote from the shank and having its cutting edge directed transversely of the shank, the said laterally extending portion of the frame including an arm hingedly coupled with the frame and to which said knife is attached, said hinge coupling between the arm and frame forming a pivot axis for the arm extending transversely of the length of the shank, and means normally resiliently holding said arm against such movement.

8. A tobacco stalk splitter and cutter of the character described, comprising a handle body, a shank extending from said handle body, a splitting blade in the form of a spear carried by the shank and directed away from the handle body, a frame unit supported on the shank between the handle and the spear and having movement around the shank as an axis and movement longitudinally of and upon the shank, said frame including a portion extending laterally from the shank, an interlocking latch means between the frame and shank, spring means carried by the shank and urging said frame in a direction thereon to maintain said latching means engaging for the prevention of the turning of the frame on the shank, an arm hingedly attached at one end to the laterally extending portion of the frame, a stalk cutting blade carried upon the other end of the arm and having its cutting edge directed transversely of said shank, said hinge means facilitating swinging of the arm and cutting blade on an axis extending transversely of the shank, and spring means normally holding said arm against such swinging movement.

ALLEN C. BEDWELL.